United States Patent [19]
Cuevas

[11] Patent Number: 5,651,563
[45] Date of Patent: Jul. 29, 1997

[54] INFLATOR WITH COMBUSTIBLE GAS MIXTURE FOR INFLATING DRIVER SIDE AIR BAG

[75] Inventor: Jess A. Cuevas, Scottsdale, Ariz.

[73] Assignee: TRW Inc., Lyndhurst, Ohio

[21] Appl. No.: 498,954

[22] Filed: Jul. 6, 1995

[51] Int. Cl.⁶ .................................................. B60R 21/26
[52] U.S. Cl. ................................................ 280/737; 222/5
[58] Field of Search .................................. 280/737, 741, 280/742; 222/5

[56] References Cited

U.S. PATENT DOCUMENTS

| | | | |
|---|---|---|---|
| 3,960,390 | 6/1976 | Goetz | 280/737 |
| 4,131,300 | 12/1978 | Radke et al. | 280/741 |
| 5,104,466 | 4/1992 | Allard et al. | 149/21 |
| 5,199,740 | 4/1993 | Frantom et al. | 280/741 |
| 5,263,740 | 11/1993 | Frey et al. | 280/737 |
| 5,301,978 | 4/1994 | Munzel et al. | 280/737 |
| 5,348,344 | 9/1994 | Blumenthal et al. | 280/737 |
| 5,378,018 | 1/1995 | Ketterer et al. | 280/737 |

FOREIGN PATENT DOCUMENTS

| | | | |
|---|---|---|---|
| 2443267 | 3/1975 | Germany | 280/737 |

Primary Examiner—Paul N. Dickson
Attorney, Agent, or Firm—Tarolli, Sundheim, Covell, Tummino & Szabo

[57] ABSTRACT

An inflator (20, 220) for inflating an air bag comprises a housing (22, 222) having a central axis (A, A1). The housing (22, 222) defines a substantially toroidal chamber (46, 246) disposed around the central axis (A, A1). An outlet opening (64, 264) in the housing (22, 222) provides fluid communication between the toroidal chamber (46, 246) and the air bag. A mixture of gases is stored in the toroidal chamber (46, 246) and comprises a combustible gas and a substantially noncombustible inflation gas for inflating the air bag. A closure (102, 302) of the housing (22, 222) has a first condition blocking the flow of gas from the toroidal chamber (46, 246) to the outlet opening (64, 264). The closure (102, 302) has a second condition allowing the flow of gas from the toroidal chamber (46, 246) to the outlet opening (62, 262). An actuatable igniter (146, 346), upon actuation, causes the closure (102, 302) to change from the first condition to the second condition and ignites the combustible gas of the mixture of gases.

25 Claims, 5 Drawing Sheets

Fig.10

INFLATOR WITH COMBUSTIBLE GAS MIXTURE FOR INFLATING DRIVER SIDE AIR BAG

BACKROUND OF THE INVENTION

1. Technical Field

The present invention relates to an inflatable vehicle occupant protection system. In particular, the present invention relates to an inflator which has a stored mixture of gases for inflating an air bag and in which at least one of the gases is combustible.

2. Description of the Prior Art

Known structures for inflating a vehicle air bag typically include a container that supports solid ignitable material, stores inflation fluid in the form of gas or stores inflation fluid and supports a relatively small amount of a solid ignitable material. In the first type of inflating structure, upon the occurrence of a high rate of vehicle deceleration which is indicative of a collision requiring inflation of the air bag, the ignitable material is ignited to generate a gas which inflates the air bag. In the second type of inflating structure, the inflation fluid stored in the container is discharged to inflate the air bag. In the third type of inflating structure, the relatively small amount of ignitable material is ignited to produce combustion products which heat and further pressurize the stored inflation fluid to inflate the air bag.

U.S. Pat. No. 5,348,344 discloses another type of inflator. The inflator provides a gas mixture including an inflation gas and a combustible gas. An igniter is energized to ignite the combustible gas, which heats the inflation gas. The heated inflation gas is directed into an air bag to inflate the air bag.

SUMMARY OF THE INVENTION

The present invention is directed to an apparatus for inflating an air bag upon the occurrence of an event requiring inflation of the air bag. The air bag inflating apparatus comprises a housing that defines a first chamber and a second chamber. An outlet opening in the housing provides fluid communication between the first chamber and an air bag. A gas mixture is stored in the first chamber and includes a combustible gas portion and an inflation gas portion for inflating the air bag. A closure has a first condition which blocks the flow of gas between the first chamber and the outlet opening. The closure has a second condition which allows gas to flow from the first chamber to the outlet opening for inflating the air bag. A member is located in the second chamber adjacent the closure. The member is movable from a first position to a second position to change the condition of the closure from the first condition to the second condition. An actuatable igniter is also located in the second chamber adjacent the member to provide, upon actuation, combustion products to (i) move the member from the first position to the second position and (ii) ignite the combustible gas portion of the gas mixture to heat and pressurize the inflation gas portion.

The housing further includes a passage which provides fluid communication between the first and second chambers. The passage is blocked when the member is in the first position. The passage is unblocked when the member is in the second position to allow a flow of the combustion products produced by actuation of the igniter into the gas mixture to ignite the combustible gas portion. The housing further includes another passage which allows fluid communication between the first chamber and the outlet opening when the closure is in the second condition.

The housing comprises a first housing portion and a second housing portion. The first housing portion surrounds the second housing portion and defines the first chamber as a toroidal chamber. The second housing portion defines the second chamber which is surrounded by the first toroidal chamber. The closure is formed in one piece with the second housing portion. The closure has a frangible portion which breaks in response to movement of the member to the second position.

A method of assembling an air bag inflator comprises the steps of providing a substantially toroidal outer housing having a central opening at one axial end. An 10 inner housing having a chamber is placed into the central opening of the outer housing. An annular axial end portion of the inner housing engages and is fixed to the outer housing at a surface axially opposite the central opening. An igniter/piston assembly is placed into the chamber in the inner housing and is fixed to the inner housing. The inner housing is fixed to the outer housing at a location adjacent the central opening.

BRIEF DESCRIPTION OF THE DRAWINGS

Further features and advantages of the present invention will become apparent to those skilled in the art to which the present invention relates from reading the following specification with reference to the accompanying drawings, in which.

DESCRRIPTION OF PREFERRED EMBODIMENT

Figure 1:
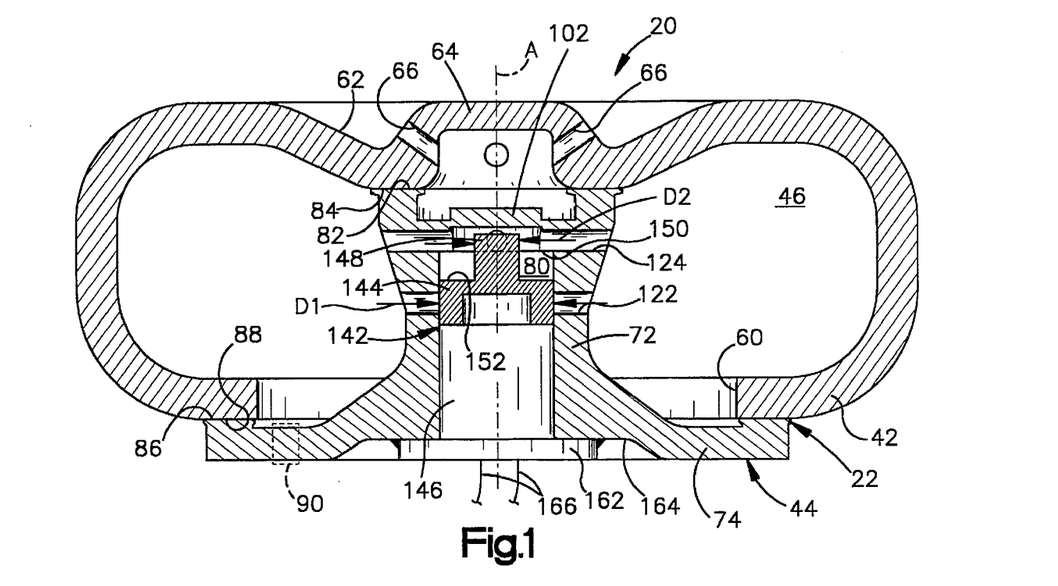
FIG. 1 is a schematic sectional view of an inflator, according to one embodiment of the present invention.

An inflator 20, as illustrated in FIG. 1, is used in a vehicle occupant protection system, such as a driver side air bag assembly. The inflator 20 is actuatable, in response to the occurrence of a predetermined situation requiring inflation of an air bag (not shown), to inflate the air bag. The inflator 20 may be constructed according to either of two illustrated embodiments of the present invention.

The inflator 20 has a longitudinal central axis A and comprises a two-piece housing 22. The housing 22 includes an outer housing portion 42 and an inner housing portion 44. The inner and outer housing portions 44, 42 are fixed together to define a substantially toroidal chamber 46 for storing a mixture of gases under pressure. The inner and outer housing portions 44, 42 are preferably forged from an aluminum alloy, such as 6061, which can withstand the pressure and composition of the mixture of gases stored in the toroidal chamber 46.

The mixture of gases includes a combustible gas portion and a noncombustible gas portion. The combustible gas portion of the mixture of gases includes a fuel gas and an oxidizer gas for supporting combustion of the fuel gas. The fuel gas is preferably hydrogen. The oxidizer gas is preferably oxygen. The noncombustible gas portion of the mixture of gases is an inert gas. The inert gas is preferably nitrogen, argon or a mixture of nitrogen and argon.

The mixture of gases in the inflator 20 readily combusts, when ignited, but otherwise is not explosive. The fuel gas is in the range of 2 to 16 molar percent of the mixture of gases. The oxidizer gas is in the range of 7 to 98 molar percent of the mixture of gases. The inert gas is in the range of 10 to 91 molar percent of the mixture of gases. Preferably, the mixture of gases includes 10–14 molar percent hydrogen, 15–25 molar percent oxygen, and 61–75 molar percent inert gas.

The mixture of gases in the chamber 46 of the inflator 20 is normally stored at a predetermined pressure. The predetermined pressure is established by such factors as the volume of the air bag to be inflated, the time available for inflating the air bag, the desired inflated pressure in the air bag, the volume of the chamber 46 of the inflator 20 for the mixture of gases, and the percentage of each of the gases in the mixture of gases. Preferably, the mixture of gases in the chamber 46 of the inflator 20 is at a pressure in the range of approximately 1,000 to 3,000 psi.

The outer housing portion 42 is generally cup-shaped with a central opening 60 in its lower axial end portion, as viewed in FIG. 1. The outer housing portion 42 has an annular recess 62 formed in its upper end portion and located concentrically about the axis A of the housing 22. The annular recess 62 surrounds and defines a diffuser 64 of the outer housing portion 42 located concentrically on the axis A. The diffuser 64 has an upward axial extent no greater than the axial extent of the rest of the outer housing portion 42. A plurality of circumferentially arranged outlet openings 66 are formed through the diffuser 64 to direct inflation gas into the air bag in a predetermined pattern.

The inner housing portion 44 has a central body 72 and a radially extending flange 74 at the lower end of the central body, a viewed in FIG. 1. The central body 72 of the inner housing portion 44 extends through the central opening 60 of the outer housing portion 42 and is located substantially within the outer housing portion along the axis A. The central body 72 of the inner housing portion 44 defines a cylindrical central chamber 80 along the axis A. The central chamber 80 is surrounded by the toroidal chamber 46. The central body 72 of the inner housing portion 44 has an upper axial end surface 82 (best seen in FIG. 3) which is annular. The upper axial end surface 82 engages an inner surface 84 of the outer housing portion 42 at a location axially opposite of the central opening 60.

The flange 74 of the inner housing portion 44 has a lower axial end surface 86 that is annular and faces in the same direction as the upper axial end surface 82 of the central body 72. The lower axial end surface 86 of the flange 74 engages an outer surface 88 of the outer housing portion 42 at its lower end around the central opening 60° The upper and lower axial end surfaces 82, 86 of the inner housing portion 44 preferably are friction welded to the respective inner and outer surfaces 84, 88 of outer housing portion 42 to define the toroidal chamber 46. Fill valve structure 90, which may include a pressure sensor, is provided in the flange 74 of the inner housing portion 44 to introduce the mixture of gases into the toroidal chamber 46.

The inner housing portion 44 has a frangible closure section 102 at its upper end, as viewed in FIG. 1. The closure section 102 is formed in one piece with the inner housing portion 44. The closure section 102 is initially in an unbroken condition to close the toroidal chamber 46 and block fluid communication between the toroidal chamber and the diffuser 64. When the closure section 102 is broken, as illustrated in FIG. 2, fluid communication is provided between the toroidal chamber 46 and the diffuser 64 to allow inflation gas to flow and inflate the air bag.

A plurality of lower passages 122 are formed in a circumferential array through the central body 72 of the inner housing portion 44. The lower passages 122 extend radially and provide fluid communication between the central chamber 80 and the toroidal chamber 46. A plurality of upper passages 124 are formed in a circumferential array through the central body 72 of the inner housing portion 44. The upper passages 122 extend radially and provide fluid communication between the toroidal chamber 46 and the diffuser 64. When the closure section 102 of the inner housing portion 44 breaks and moves away from the inner housing portion, as illustrated in FIG. 2, gas may flow from the toroidal chamber 46 through the upper passages 124 and into the diffuser 64.

An igniter/piston assembly 142 is located in the central chamber 80 in the central body 72 of the inner housing portion 44. A piston 144 is fixed to an end of an igniter 146, preferably by laser beam welding. The piston 144 has a lower section, as viewed in FIG. 1, with an outer diameter D1 that is slightly smaller than the diameter of the majority of the central chamber 80. An upper section of the piston 144 has a diameter D2 which is preferably less than half of the diameter D1 of the lower section of the piston.

Figure 2:
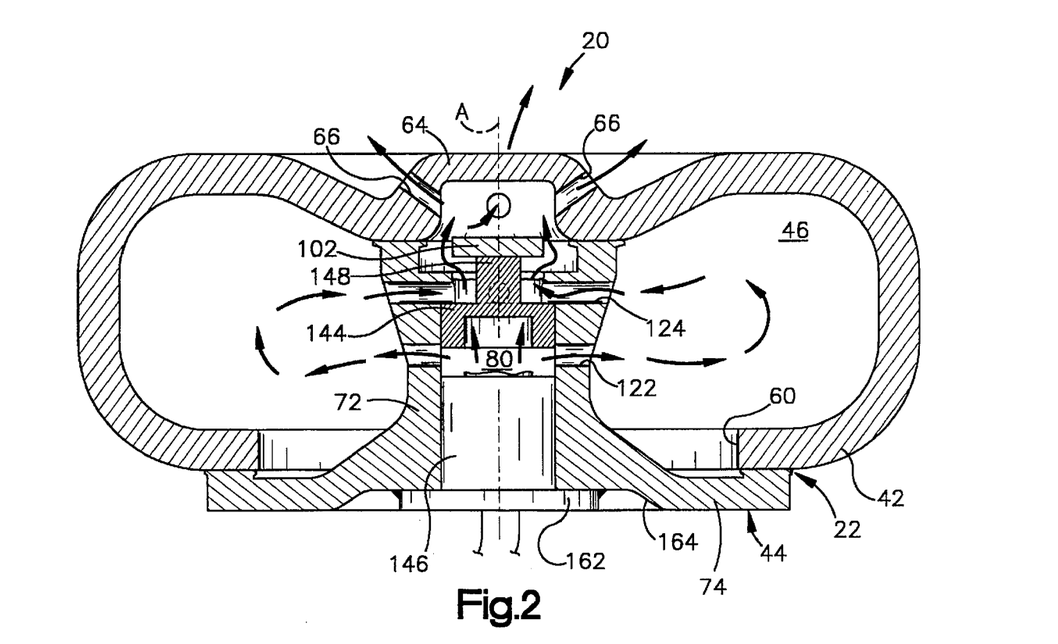
FIG. 2 is a view of the inflator of FIG. 1, after actuation, with parts illustrated in different positions.

The igniter 146 contains a quantity of ignitable material which, when ignited, produces combustion products, including heat, pressure and hot particles, to separate and move the piston 144 from a first position, illustrated in FIG. 1, to a second position, illustrated in FIG. 2. The piston 144 has an end portion 148 which engages and breaks the closure section 102 of the inner housing portion 44 when the piston moves to the second position. The inner housing portion 44 includes an annular shoulder 150 having a diameter which is smaller than the diameter of a lower portion of the chamber 80. The shoulder 150 is located at an upper portion of the chamber 80 at the upper passages 124. The shoulder 150 engages an upper annular surface 152 of the piston 144 to limit upward movement of the piston relative to the inner housing portion 44.

The piston 144 is initially located in the first position blocking the lower passages 122. When the piston 144 is moved to the second position, the lower passages 122 are unblocked to allow the hot particles of the combustion products to flow radially outward from the chamber 80 into the toroidal chamber 46 and ignite the combustible gas portion of the mixture of gases. When the combustible gas portion of the mixture of gases ignites, the burning of the combustible gas heats and pressurizes the non-combustible gas portion. The mixture of the inflation gas and the combustible gas, both burned and unburned, flows outwardly through the upper passages 124, around the upper section of the piston 144 having the relatively small outer diameter D2 and into the diffuser 64 to be directed into the air bag.

Upon the occurrence of sudden vehicle deceleration requiring inflation of the air bag, a deceleration sensor activates the igniter 146 in the chamber 80 to ignite the combustible gas portion in the mixture of gases in the toroidal chamber 46. As the combustible gas portion burns, the pressure in the toroidal chamber 46 rises due to warming of the inflation gas by the heat of combustion. The inflation gas flows into the air bag to inflate the air bag. The air bag is, thus, inflated by the inert noncombustible gas, combustion products of the burned combustible gas portion and unburned oxidizer gas.

Figure 3:
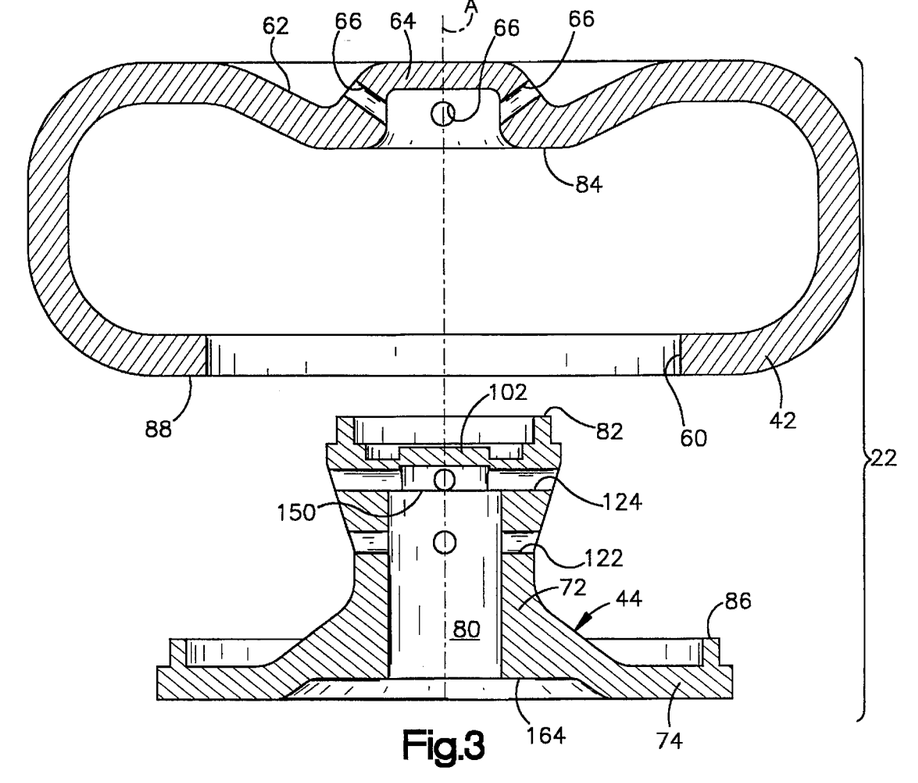
FIGS. 3–5 are sectional views of the steps of assembling the inflator of FIG. 1.
Figure 4:
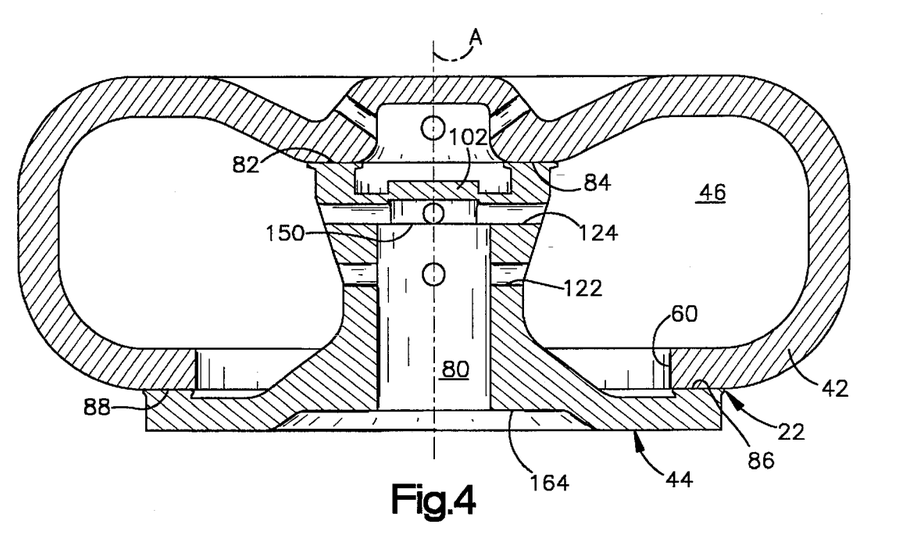

To assemble the inflator 20 illustrated in FIG. 1, the outer housing portion 42 is provided, as illustrated in FIG. 3, and is suitably supported. The inner housing portion 42 with the closure section 102 is moved axially along the axis A into the outer housing portion 42 through the central opening 60. The annular surfaces 82, 86 of the inner housing portion 44 engage the outer housing 42 at the axially spaced surfaces 84, 88, respectively. The inner housing portion 44 is then rotated relative to the outer housing portion 42 to friction weld both annular surfaces 82, 86 to the annular surfaces 84, 88 of the outer housing portion, as illustrated in FIG. 4. The friction weld at the surface 84 of the upper end of the inner housing portion 44 seals the diffuser 64 from the toroidal chamber 46. The friction weld at the surface 88 of the lower end of the inner housing portion 44 seals the toroidal chamber 46 and the central opening 60.

Figure 5:
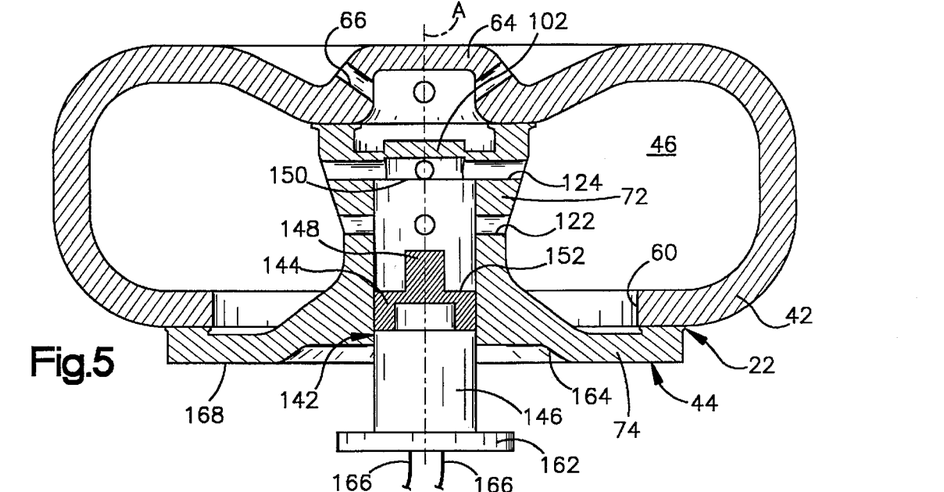

As illustrated in FIG. 5, the igniter/piston assembly 142 is then moved along the axis A into the central chamber 80 in the inner housing portion 44 to the position illustrated in FIG. 1. A flange 162 at the lower end of the initiator 146, as viewed in FIG. 5, is then welded, preferably by laser beam welding, to a surface defining a recess 164 in the lower end of the inner housing portion 44. Thus, no portion of the igniter 146, other than electrical wires 166, extends downward beyond the axial extent of a lowermost end surface 168 of the flange 74 of the inner housing portion 44.

Figure 6:
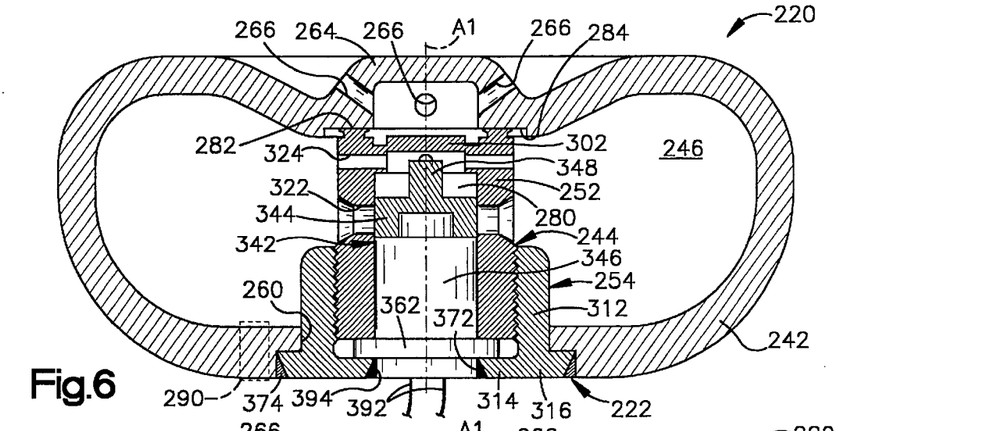
FIG. 6 is a schematic sectional view of an inflator, according to another embodiment of the present invention.

An inflator 220 according to another embodiment of the present invention is illustrated in FIG. 6. The inflator 220 comprises a three-piece housing 222 with a central axis A1. The housing 222 includes an outer housing portion 242 and an inner housing assembly 244. The outer housing portion 242 includes a diffuser 264 with outlet openings 266. The inner housing assembly 244 includes an inner housing member 252 and an intermediate housing member 254. The outer housing portion 242, the inner housing member 22 and intermediate housing member 254 are forged from an aluminum alloy, such as 6061.

When the outer housing portion 242 and inner housing assembly 244 are fixed together, a toroidal chamber 246 is defined for storing a mixture of gases under pressure. The mixture of gases is the same as that stored in the inflator 20 illustrated in FIG. 1 and described above.

The outer housing portion 242 has a central opening 260 in its lower end, as viewed in FIG. 6. The inner housing member 252 of the inner housing assembly 244 defines a central chamber 280. The inner housing assembly 244 extends through the central opening 260 in the outer housing portion. An upper axial end surface 282 (FIGS. 6 and 8) of the inner housing member 252 is annular and is welded to an inner surface 284 of the outer housing portion 242 to seal the toroidal chamber 246 from the diffuser 264. The inner surface 284 is located axially opposite the central opening 260 near the upper end of the outer housing portion 242 which forms part of the diffuser 264. A fill valve 290 in a lower end of the outer housing portion 242 allows the mixture of gases to be introduced into the toroidal chamber 246.

A frangible closure section 302 is formed in one piece with the inner housing member 252. The inner housing member 252 has radially extending lower passages 322 and upper passages 324. The lower passages 322 provide fluid communication between the central chamber 280 and the toroidal chamber 246. The upper passages provide fluid communication between the toroidal chamber 246 and the diffuser 264. The closure section 302 initially blocks fluid communication between the toroidal chamber 246 and the diffuser 264 when the closure is in an unbroken condition. When the closure section 302 is broken, fluid communication is provided between the toroidal chamber 246 and the diffuser 264 to inflate an air bag (not shown).

An igniter/piston assembly 342 includes an energizable igniter 346 and a piston 344 that is initially attached to the igniter and separable from the igniter upon energization of the igniter. A flange 362 is located at a lower end of the igniter 346. The igniter/piston assembly 342 is received in the inner chamber 280 of the inner housing member 252 so that the flange 362 on the igniter 346 engages a lower surface of the inner housing member.

The intermediate housing member 254 has a generally tubular portion 312. At one end of the tubular portion 312 are a radially inward extending flange 314 and a radially outward extending flange 316. The tubular portion 312 has threads formed on its inner surface.

The tubular portion 312 of the intermediate housing member 254 is screwed into an outer surface of the inner housing member 282. The flange 314 of the intermediate housing member 254 engages the lower surface of the flange 362 of the igniter 346 to retain the igniter/piston assembly 342 in the chamber 280 in the inner housing member 252. The flange 314 of the intermediate housing member 254 is fixed to the igniter 346 at a weld 372 to seal the central chamber 280. The flange 314 of the intermediate housing member 254 is fixed to the outer housing portion 242 at a weld 374 to seal the toroidal chamber 246.

Figure 7:
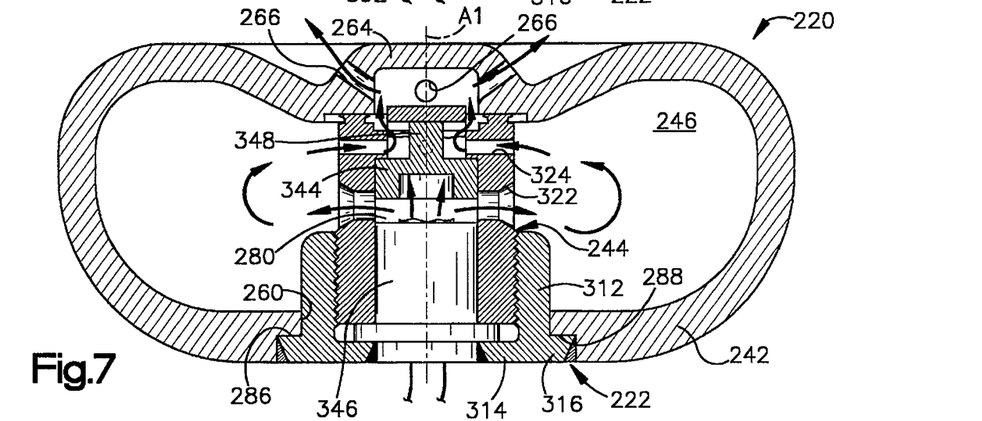
FIG. 7 is a view of the inflator of FIG. 6, after actuation, with parts illustrated in different positions.

Upon energization of the igniter 346, combustion products, including heat, pressure and hot particles, are produced which move the piston 344 to a second position in the chamber 280 from its initial first position attached to the igniter. The piston 344 has an end portion 348 which engages and ruptures the closure section 302 to provide fluid communication between the toroidal chamber 246 and the diffuser 264, as illustrated in FIG. 7. When the piston 344 moves to the second position, the lower passages 322 are unblocked so the chamber 280 is in fluid communication with the toroidal chamber 246.

The piston 344 is stopped from moving further along the axis A towards the diffuser 264 by a surface 350 on the inner housing member 252 engaging a surface 352 on the piston. This assures that the piston 344 does not block the upper passages 324 in the inner housing member 252. When the piston 344 moves upwardly to its second position, as viewed in FIG. 7, the combustion products are directed radially outwardly through the unblocked lower passages 322 to ignite the combustible gas portion of the mixture of gases to heat and pressurize the non-combustible inflation gas portion.

Figure 8:
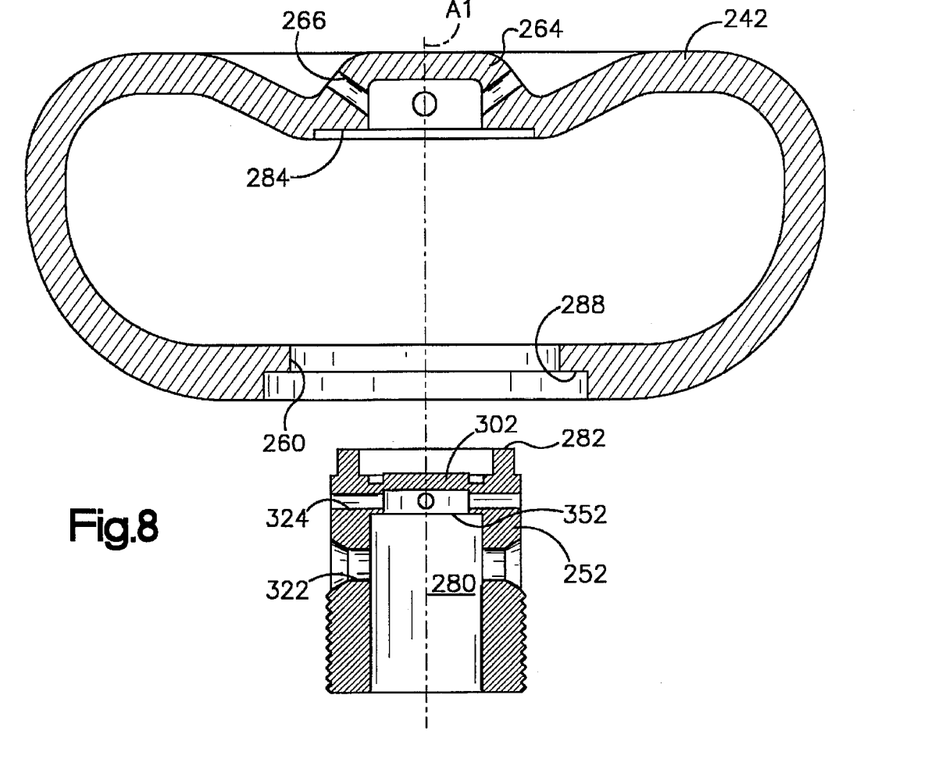
FIGS. 8–10 are sectional views of the steps of assembling the inflator of FIG. 6.
Figure 9:
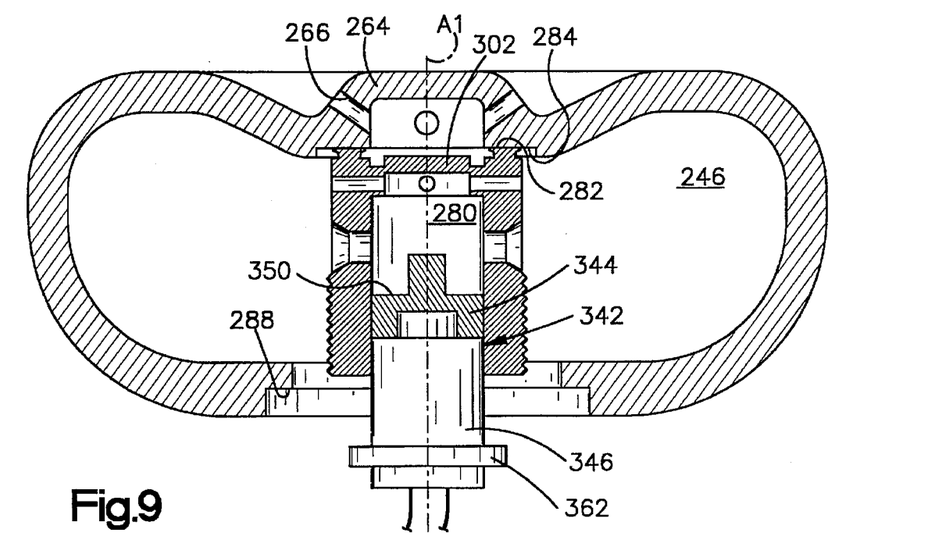
Figure 10:
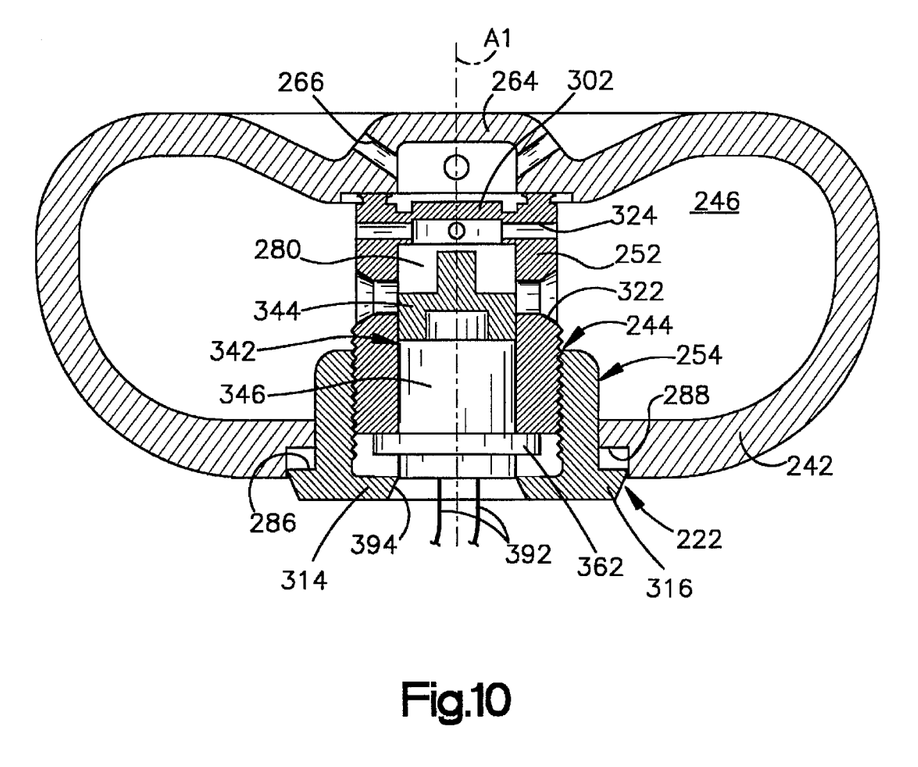

To assemble the inflator 222 illustrated in FIG. 6, the outer housing portion 242 is provided and is suitably supported, as viewed in FIG. 8. The inner housing member 252 of the inner housing portion 244 is moved along the axis A1 through the central opening 260 of the outer housing portion 242. The axial end surface 282 of the inner housing member 252 is brought into engagement with the inner surface 284 of the outer housing portion 242. The inner housing member 252 is rotated relative to the outer housing portion 242 to friction weld the inner housing member 252 to the outer housing portion 242 at the axial surface 282.

The igniter/piston assembly 342 is moved along the axis A1 into the chamber 280 in the inner housing member 252. The intermediate housing member 254 is then screwed onto the inner housing member 252 so the inner flange 314 engages a flange 362 of the igniter 346 to retain the igniter/piston assembly 342 in the chamber 280 in the inner housing member 252. Electrical lead wires 392 of the igniter 346 extend through an opening 394 in the lower end of the intermediate housing member 254, as viewed in FIG. 6. The intermediate housing member 254 is then fixed to the outer housing portion 242 at weld 374 and to the igniter 346 at weld 372 to seal both chambers 246, 280.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for inflating an air bag, said apparatus comprising:

a housing defining a first chamber and a second chamber surrounded by the first chamber, said housing having an outlet opening to provide fluid communication between the first chamber and an air bag;

a mixture of gases stored in the first chamber, said mixture of gases comprising a combustible gas portion and a substantially noncombustible inflation gas portion for inflating the air bag;

a closure having a first condition blocking the flow of gas from the first chamber to the outlet opening, said closure having a second condition allowing the flow of gas from the first chamber to the outlet opening;

a member located in the second chamber, said member having a first axial end portion located adjacent said closure and a second axial end portion, said member being movable from a first position to a second position to change the condition of said closure from the first condition to the second condition;

an actuatable igniter in the second chamber to provide, upon actuation, combustion products to (i) move the member from the first position to the second position and (ii) ignite the combustible gas portion of the mixture of gases, said igniter having a first axial end portion located adjacent said second axial end portion of said member and a second axial end portion axially spaced from said member; and a passage in said housing providing fluid communication between the first chamber and the second chamber, said passage being located adjacent said second axial end portion of said member and adjacent said first axial end portion of said igniter, a portion of said member blocking flow through the passage when said member is in the first position, said portion of said member allowing the flow of combustion products produced by actuation of said igniter through the passage and into the mixture of gases in the first chamber to ignite the combustible gas portion when said member is in the second position.

2. The apparatus in claim 1 wherein said housing comprises a first housing portion and a second housing portion welded to said first housing portion, said first and second housing portions cooperating to define the first chamber as a toroidal chamber, said second housing portion defining the second chamber.

3. The apparatus in claim 2 wherein said closure is formed in one piece with said second housing portion, said closure being frangible and breaking in response to movement of said member to the second position to define the second condition of said closure.

4. The apparatus in claim 2 further including a diffuser formed in said first housing portion and wherein the outlet opening extends through said diffuser, and further including a second passage extending through said second housing portion to provide fluid communication between the first chamber and the outlet opening when said closure is in the second condition.

5. The apparatus in claim 2 further including a surface on said second housing portion for limiting movement of said member.

6. The apparatus in claim 2 wherein said second housing portion is friction welded to said first housing portion at two axially spaced annular surface areas.

7. The apparatus in claim 1 wherein said igniter has an outer diameter substantially equal to an outer diameter of said member.

8. The apparatus in claim 7 wherein said outer diameter of said member is slightly smaller than a diameter of the second chamber.

9. The apparatus in claim 1 further including a second passage located in said housing to provide fluid communication between the first chamber and the outlet opening when said closure is in the second condition.

10. The apparatus in claim 1 wherein the first chamber is substantially toroidal-shaped.

11. An apparatus for inflating an air bag, said apparatus comprising:

a housing having a central axis and defining a substantially toroidal chamber surrounding the central axis, said housing including an outlet opening to provide fluid communication between the toroidal chamber and an air bag;

a mixture of gases stored in the toroidal chamber, said mixture of gases comprising a combustible gas portion and an inflation gas portion for inflating the air bag;

a closure portion of said housing having a first condition blocking the flow of gas from the toroidal chamber to the outlet opening, said closure portion of said housing having a second condition allowing the flow of gas from the toroidal chamber to the outlet opening;

an actuatable igniter to cause, upon actuation, the closure portion of the housing to change from the first condition to the second condition and to ignite the combustible gas portion of said mixture of gases;

an igniter chamber for receiving said igniter and having a diameter substantially equal to a diameter of said igniter;

a passage extending through a housing portion defining said igniter chamber for providing fluid communication between the igniter chamber and the toroidal chamber; and a movable member having a first position spaced from said closure portion and blocking said passage, said movable member having a second position in which said closure portion is engaged by said movable member to change the condition of said closure portion to its second condition and allowing fluid communication between the igniter chamber and the toroidal chamber through the passage.

12. The apparatus in claim 11 wherein said member is located in the igniter chamber and movable in response to actuation of said igniter to change the condition of said closure portion of said housing from the first condition to the second condition, the igniter chamber being located along the central axis and surrounded by the toroidal chamber.

13. The apparatus in claim 12 wherein said igniter has an outer diameter substantially equal to an outer diameter of said member.

14. The apparatus in claim 11 further including a second passage which allows fluid communication between the toroidal chamber and said outlet opening when said housing portion of said closure is in the second condition.

15. The apparatus in claim 11 wherein said housing comprises a first housing portion and a second housing portion fixed to said first housing portion, said first housing portion surrounding said second housing portion to define the toroidal chamber, said second housing portion defining the igniter chamber.

16. The apparatus in claim 15 wherein said closure portion of said housing is formed in one piece with said second housing portion, said closure portion of said housing being frangible and breaking in response to actuation of said igniter.

17. An apparatus comprising:
a housing having a central axis and an outlet, said housing defining a substantially toroidal chamber and defining a second chamber surrounded by the first chamber, said housing having a flow passage extending between the toroidal chamber and the second chamber;
a mixture of gases stored in the toroidal chamber, said mixture of gases comprising a combustible gas portion and an inflation gas portion for inflating a vehicle air bag;
a closure having a first condition blocking fluid communication between the toroidal chamber and the outlet, said closure having a second condition allowing fluid communication between the first chamber and the outlet;
a piston in the second chamber and having an outer diameter slightly smaller than a diameter of the second chamber, said piston having a first position blocking the flow passage and being movable to a second position in which the flow passage is unblocked and in which the condition of said closure is changed from the first condition to the second condition; and
an actuatable igniter in said second chamber to produce, upon actuation, combustion products which move said piston to the second position and allow the flow of the combustion products through the flow passage to ignite the combustible gas portion of the mixture of gases in the toroidal chamber, said igniter having an outer diameter substantially equal to said outer diameter of said piston.

18. The apparatus in claim 17 wherein said housing comprises only two housing portions fixed together by friction welds.

19. The apparatus in claim 17 wherein said housing comprises only three parts, the first and second parts being friction welded together and the third part being screwed onto one of the first and second parts and welded to the other of the first and second parts.

20. The apparatus in claim 19 wherein said closure is formed in one piece with one of said first and second parts.

21. The apparatus in claim 17 wherein said piston is initially fixed to said igniter to define the first position and said piston separates from said igniter in response to actuation of said igniter to define the second position.

22. A method of assembling a driver side air bag inflator, said method comprising the steps of:
providing an outer housing portion having a central opening at one axial end and a diffuser at an axially opposite end;
placing an inner housing portion having a chamber and a closure into the central opening of the outer housing portion;
engaging a first annular surface of the inner housing portion with an inner surface of the outer housing portion adjacent the diffuser;
fixing the first annular surface of the inner housing portion to the inner surface of the outer housing portion to close the interior of the outer housing portion from the diffuser;
placing an igniter/piston assembly into the chamber in the inner housing portion;
fixing the igniter/piston assembly to the inner housing portion; and
fixing the inner housing portion to the outer housing portion at a location adjacent the central opening to define a closed and substantially toroidal chamber.

23. The method of claim 22 wherein said step of fixing the inner housing portion to the outer housing portion further includes the step of fixing a second annular surface of the inner housing portion to an outer surface of the outer housing portion about the central opening.

24. The method of claim 22 wherein said step of fixing the inner housing portion to the outer housing portion includes the steps of:
providing an inner housing member having an annular end surface and a chamber;
providing an intermediate housing member having a flange and a tubular portion with a thread;
fixing the inner housing member to the outer housing portion at the annular end surface;
screwing the tubular portion of the intermediate housing member onto the inner housing member so the flange of the intermediate housing member engages the igniter/piston assembly to retain the igniter/piston assembly in the chamber of the inner housing member; and
welding the intermediate housing member to the outer housing portion.

25. An apparatus for inflating an air bag, said apparatus comprising:
a housing defining a first chamber and a second chamber surrounded by the first chamber, said housing having an outlet opening to provide fluid communication between the first chamber and an air bag, said housing comprising a first housing portion and a second housing portion welded to said first housing portion, said first and second housing portions cooperating to define the first chamber as a toroidal chamber, said second housing portion defining the second chamber, said second housing portion comprising an inner housing member friction welded to said first housing portion at an annular surface and an intermediate housing member screwed onto said inner housing member and welded to said first housing portion;
a mixture of gases stored in the first chamber, said mixture of gases comprising a combustible gas portion and a substantially noncombustible inflation gas portion for inflating the air bag;
a closure having a first condition blocking the flow of gas from the first chamber to the outlet opening, said closure having a second condition allowing the flow of gas from the first chamber to the outlet opening;
a member located in the second chamber adjacent said closure, said member being movable from a first position to a second position to change the condition of said closure from the first condition to the second condition;
an actuatable igniter in the second chamber adjacent said member to provide, upon actuation, combustion products to (i) move the member from the first position to the second position and (ii) ignite the combustible gas portion of the mixture of gases; and a passage in said housing providing fluid communication between the first chamber and the second chamber, a portion of said member blocking flow through the passage when said member is in the first position, said portion of said member allowing the flow of combustion products produced by actuation of said igniter through the passage and into the mixture of gases in the first chamber to ignite the combustible gas portion when said member is in the second position.

* * * * *